Feb. 3, 1970   D. EPPLER   3,492,854
HIGH COMPRESSION FORCE STAKING TOOL
Filed Feb. 21, 1968   4 Sheets-Sheet 1

INVENTOR.
DANIEL EPPLER
BY
ATTORNEY

Feb. 3, 1970 D. EPPLER 3,492,854
HIGH COMPRESSION FORCE STAKING TOOL
Filed Feb. 21, 1968 4 Sheets-Sheet 2

INVENTOR.
DANIEL EPPLER
BY *David Treuline*
ATTORNEY

INVENTOR.
DANIEL EPPLER

ATTORNEY

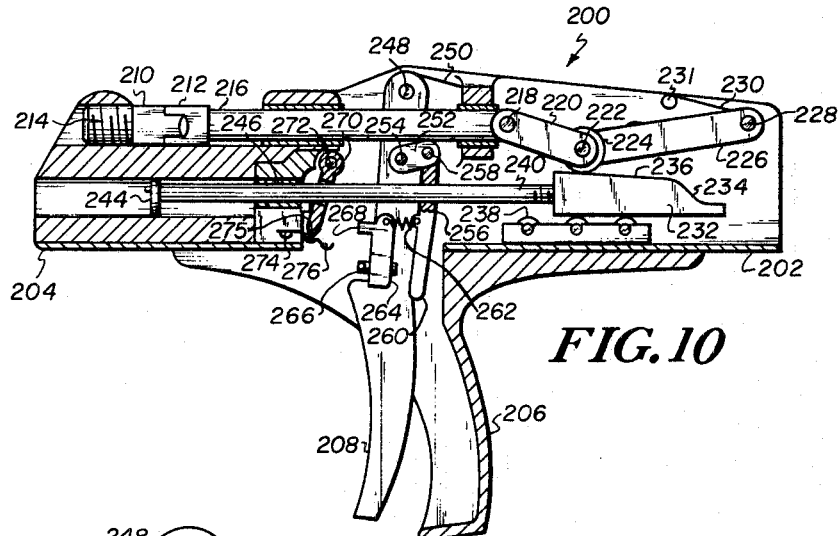
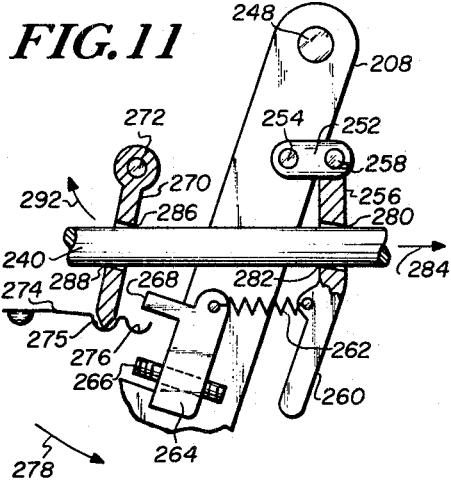
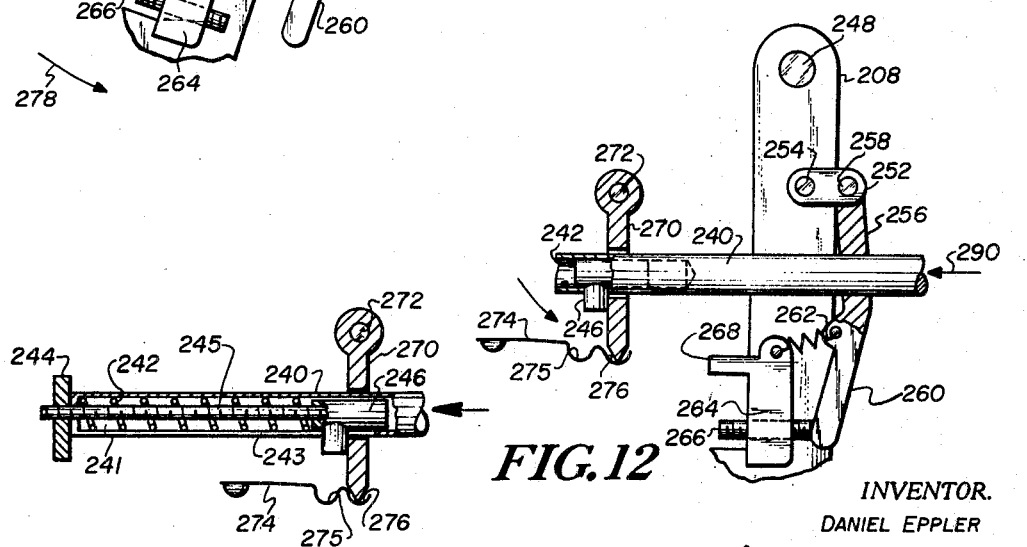

United States Patent Office 3,492,854
Patented Feb. 3, 1970

3,492,854
HIGH COMPRESSION FORCE STAKING TOOL
Daniel Eppler, Nutley, N.J., assignor to Thomas & Betts Corporation, Elizabeth, N.J., a corporation of New Jersey
Filed Feb. 21, 1968, Ser. No. 707,277
Int. Cl. B21d 9/05
U.S. Cl. 72—412                           21 Claims

ABSTRACT OF THE DISCLOSURE

The disclosure is directed to a one hand operated high compression force staking tool for installing electrical connectors to electrical conductors. The tool consists of a ram and various force multiplying mechanisms for converting low hand applied force, at a movable handle, to high compression forces to be applied via the ram to the die set. Hand force applied to a friction ring to move a ram in a first direction. Coupled to the ram is a cam having a steep rise portion to cause the movable die of the die set to rapidly close. On the return portion of the operating cycle the ram position is maintained at the position achieved during the power portion of the cycle. In a first embodiment of the device a friction ring is used to retain the ram position whereas in a second embodiment of the device a rack and dog arrangement is used to maintain the ram position. After a predetermined force is applied to the die set, the following handle stroke permits the release of the second friction ring or rack and dog and restores the ram and die set to their initial positions.

BACKGROUND OF THE INVENTION

Field of the invention

The invention is directed to the field of high compression force hand operated tools for deforming a first element into intimate contact with a second element. The tool finds particular utility in the field of installing electrical connectors to electrical conductors by deforming both the connector and conductor into intimate mechanical and electrical contact.

Description of the Prior Art

Staking or crimping tools for installing electrical connectors, other than the smallest sizes, to electrical conductors found in the prior art are generally of the plier type, pump type or hydraulically operated. The plier type, as exemplified by the patents to Motches et al., Patent No. 2,838,970, issued June 17, 1958, for a "Replaceable Die Nest Crimping Tool," and Lynch, Jr., Patent No. 33,066,-717, issued Dec. 4, 1962, for a "Crimping Tool," are large and cumbersome and require two hand operation. In actual practice, one arm of the tool is often placed on the floor and the other arm has force applied to it by use of both hands or one or both feet. These tools provide little force multiplication other than that of a simple lever. Thus great physical strength is required to move and operate tools of this type.

The pump type tool is exemplified by the patent to Badeau, No. 2,687,149, issued Aug. 24, 1954, for a "Portable Crimping Apparatus." This tool is a pump handle operated hydraulic tool of low portability. Great strength is required to move the tool and two hand operation of the pump handle is required.

The hydraulically operated tool is exemplified by the patent to Clapp, No. 2,568,054, issued Sept. 18, 1951, for a "Suspended Crimping Tool." This tool is neither manually operated nor reasonably portable.

SUMMARY OF THE INVENTION

The invention is directed to portable, one hand operated high compression force staking tool which overcomes the difficulties noted above with respect to prior art devices. The tool employs high force multiplying mechanisms so that hand force of approximately 35 pounds applied to the handles of the tool is multiplied to approximately 4,000 pounds at the staking die set. The tool requires multiple hand strokes to develop the desired high compression force in incremental steps. A specially shaped cam operated by a ram permits the rapid closure of the die set about the connector on the first stroke to hold the connector in the die set. Successive strokes build up the applied force at the die set to produce the staking desired. Further, the incremental application of force mechanism assures a positive mechanical and electrical connection since die set release cannot be achieved until full compression force is developed and applied to the connector.

The drive for the ram is achieved by use of a one way drive friction ring which on the power portion of the movable handle cycle drives the ram. On the return portion of the handle cycle, the friction ring merely returns to its initial position. In a first embodiment of the device, the ram position is maintained during the friction drive ring return by a one way friction restraining ring. The friction restraining ring operates to hold the ram in its advanced position and is inoperative during the power portion of the cycle. In a second embodiment, ram restraining is achieved by a rack-dog arrangement.

When the desired compression forces have been applied to the connector, the ram is released, releasing the die set and completed connector-conductor assembly. Because of the great force multiplication, a light weight, one hand operated, portable, high compression tool is achieved. It is therefore an object of this invention to provide an improved hand operated, portable, high compression staking tool.

It is another object of this invention to provide a relatively small, light weight, one hand operated high compression staking tool.

It is yet another object of this invention to provide an improved high compression force developing mechanism force developing mechanism employing alternately operative friction drive and friction restraining rings.

It is yet another object of this invention to provide an improved hand operated high compression force staking tool with a high compression force developing mechanism employing alternately operative friction drive and friction restraining rings.

It is still another object of this invention to provide an improved high compression force developing mechanism employing alternately operative friction drive ring and rack and dog restraining means.

It is still another object of this invention to provide an improved hand operated high compression force staking tool with a high compression developing mechanism employing alternately operative friction drive ring and rack and dog restraining means.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

FIG. 10 is a side elevation of the tool, as shown in FIG. 9, as it appears in the operated position.

FIGS. 11 and 12 illustrate the manner of operation of the friction drive and restraining rings of FIG. 9.

FIG. 13 is a side elevation, fragmentary and in section, of a portion of the shaft of FIG. 9.

Similar elements are given similar reference characters in each of the respective figures.

DESCRIPTION OF THE PREFERRED EMBODIMENTS

Figure 1:
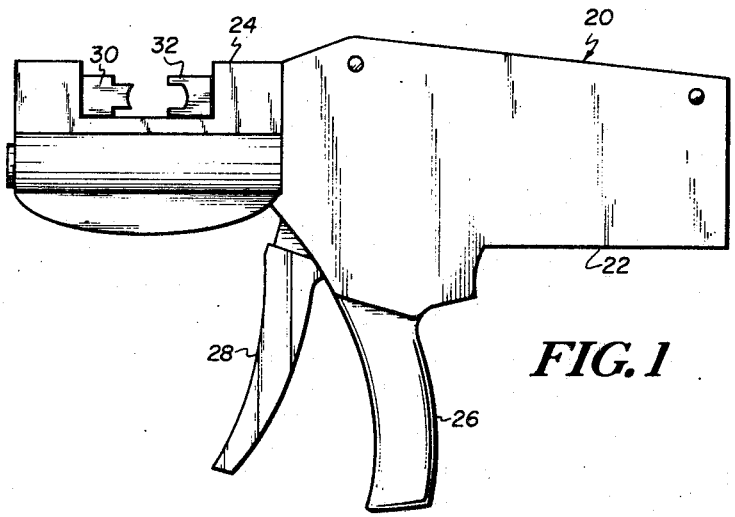
FIG. 1 is a side elevation of a first embodiment of a tool constructed in accordance with the concepts of the invention.

Turning now to FIG. 1, there is shown tool 20 constructed in accordance with the concepts of the invention. Tool 20 has a body portion 22 shown with the housing completely assembled thereto and a die end 24. Attached to and part of the body 22 is a fixed handle 26. Pivotly mounted to the body 22 and adapted for movement with respect to the body 22 and fixed handle 26 is a movable handle 28. At the die end 24 is a fixed die 30 whose position is adjustable by means to be described below and a movable die 32 adapted for movement, with respect to the fixed die 30, by means of mechanisms linked to the movable handle 28. A connector to be assembled to the stripped portion of an electrical conductor is placed between the dies 30 and 32 and the stripped portion of the electrical conductor is placed within the connector. Movable handle 28 is then squeezed by hand action toward the fixed handle 26, which, in successive strokes will cause the closing of the movable die 32 against the connector and fixed die 30 causing a mechanical and electrical connection by crimping action.

Figure 2:
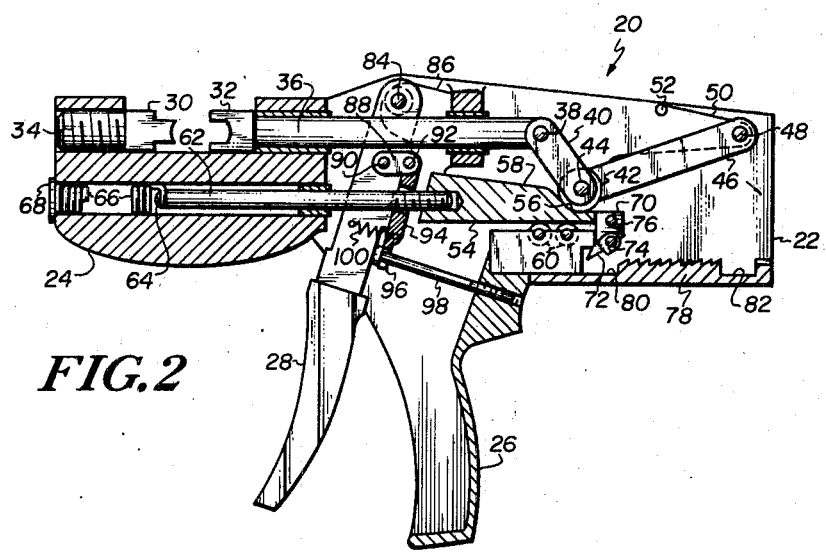
FIG. 2 is a side elevation of the tool of FIG. 1 with the housing removed and portions shown in section as it appears in the open position.

Referring now to FIG. 2, the tool of FIG. 1 is shown with the outer housing removed to expose the entire mechanism thereof. Fixed die 30 may be adjusted by means of a screw 34 which permits the movement of the fixed die 30 with respect to the die end 24 depending upon the size of the dies and their particular condition. For example, based upon the size of the connector to be used or the condition of wear of the dies 30 and 32, the screw 34 may be used to properly position the fixed die 30 prior to use. Movable die 32 is connected by means of a link 36, pivot 38 and a further link 40 to cam follower 42, coupled at pivot 44. A link 46, also coupled at pivot 44 to the cam follower 42. Link 46 is coupled to a further pivot 48. A tension spring 50 is coupled between a fixed stop 52 and the link 46 to cause returning of the link 46 to the position shown in FIG. 2, after operation, permitting the opening of the die set made up of the movable die 32 and the fixed die 30. Cam follower 42 engages a cam 54 having a sharp rise portion 56 and a slow rise portion 58. Cam 54 rides upon a pair of rollers 60 and is coupled to a shaft 62. Shaft 62 is coupled by means of a fastener 64 to a tension spring 66 whose tension may be adjusted by means of the screw 68. The tension spring 66 will provide a return for the shaft 62 and the cam 54 coupled thereto to return it to the initial position shown in FIG. 2. Cam 54 terminates in a block 70 which has mounted thereon a dog 72 free to pivot about the pivot point 74. Coupled between the dog 72 and the block 70 is a tension spring 76. The dog 72 is arranged to engage a rack 78 having adjacent thereto release portions 80 and 82 respectively. When the dog 72 is in the release position 80 it will not engage the rack 78 and the cam 54 is thus free to move in either direction. When the dog 72 has been positioned by means of the cam 54 in the release area 82 at the end of the stroke (to be described below) the cam 54 will be free to move from its rightmost position to the position shown in FIG. 2. Dog 72 and rack 78 provide a shaft 62 restraining device.

Movable handle 28 is coupled to the body 22 at pivot 84 and is provided with a return spring 86 mounted between the handle 28 and the body 22. Also coupled to the movable handle 28 is a further link 88 coupled by means of a pivot pin 90. Coupled to link 88 by means of a further pivot 92 is apertured friction drive ring 94 employed to drive the shaft 62 and thus advance the cam 54 from the position shown in FIG. 2 to the rightmost position as well be described below. Friction drive ring 94 terminates in an apertured tab 96 through which is placed a threaded screw 98 fastened into the body 22 of the tool 20. The head of the screw 98, based upon the setting of the screw 98, will limit the movement of the friction drive ring 94 toward the left of the figure while permitting free movement of the friction drive ring 94 to the right of the figure. Friction drive ring 94 is coupled to the movable handle 28 by means of a tension spring 100.

Figure 6:
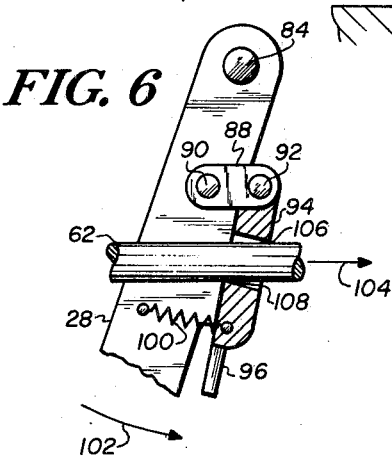
FIGS. 6 and 7 illustrate the manner of operation of the friction drive ring of FIG. 2.
Figure 7:
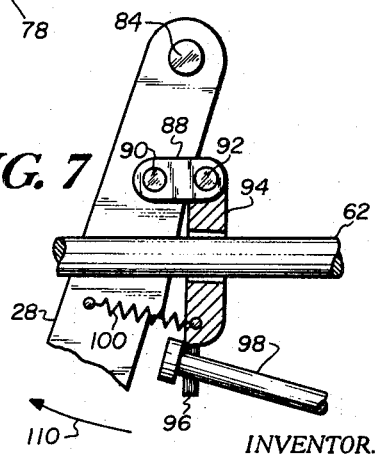

In order to appreciate the manner in which the friction drive ring 94 operates to advance the shaft, 62, reference is now made to FIGS. 6 and 7. When the movable handle 28 is moved in a direction shown by the arrow 102 (FIG. 6) friction drive ring 94 will similarly be urged in the direction shown by the arrow 102 due to the link 88 coupling the friction drive ring 94 to the movable handle 28. Friction drive ring 94 will engage the shaft 62 at the points 106 and 108. This position is established by the action of the tension spring 100 which tends to keep the friction drive ring 94 inclined with respect to the longitudinal axis of the shaft 62. The points of frictional engagement 106 and 108 of the friction drive ring 94 on the shaft 62, together with the movement of the movable handle 28 in the direction shown by the arrow 102 will result in the movement of the shaft 62 in the direction shown by the arrow 104. This movement will continue for the entire stroke of the movable handle 28 until it reaches its stop position with respect to the fixed handle 26. When the stop position of the movable handle 28 is reached the release of hand applied force to the movable handle 28 will permit the return spring 86 (FIG. 2) to move the movable handle 28 in the direction shown by the arrow 110 as shown in FIG. 7. As the movable handle 28 moves in the direction shown by the arrow 110, link 88 will cause the friction drive ring 94 to swing in the direction generally shown by the arrow 110 and minimize the frictional coupling between the friction drive ring 94 and the shaft 62. A slight frictional engagement between the friction drive ring 94 and the shaft 62 exists, however it will be insufficient to permit movement of the shaft to the left of the FIG. 7. A dog 72 and rack 78 restraining device, in a manner to be described below, prevents the movement of the shaft 62 to the left of FIG. 2. The head screw 98 will engage the tab 96 and hold the friction drive ring 94 at a neutral position to permit the shaft 62 to be returned to its initial position in a manner to be described below.

Figure 4:
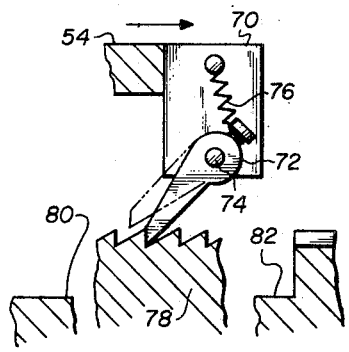
FIGS. 4 and 5 illustrate the manner of operation of the dog and rack restraining member of FIG. 2.
Figure 5:
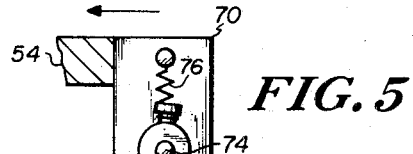

Referring now to FIGS. 4 and 5, the dog 72 and rack 78 restraining device is illustrated. When the tool 20 is in an open position, as shown in FIG. 2, the dog 72 will engage the release area 80. However, as the shaft 62 is advanced by means of the friction drive ring 94 it will cause the cam 54 to be displaced towards the right of FIG. 2. As cam 54 moves towards the right it will move with it, the block 70 causing the engagement of the dog 72 with the teeth of the rack 78. During the time that the friction drive ring 94 is moved with respect to the shaft 62, as is shown in FIG. 7, the engagement between the dog 72 and the teeth of the rack 78 will hold the cam 54 and the shaft 62 in the position established by the movement of the movable handle 28 in the direction 102 as shown in FIG. 6. Tension spring 76 will cause the dog 72 to maintain its position engaged with the teeth of the rack 78 and prevent the movement of the shaft 62 and the cam 54 in the direction to the left of FIG. 2. For each stroke of the movable handle 28, in the direction shown by the arrow 102 of FIG. 6, the dog 72 will be caused to advance along the teeth of the rack 78 until such time as the dog 72 enters the release area 82. The combination of the dog 72 reaching the release area 82 and the friction drive ring 94 being held in its neutral position (as shown in FIG. 7) will permit the tension spring 66, as shown in FIG. 2, to return the shaft 62 and the cam 54 to the position as shown in FIG. 2.

Figure 3:
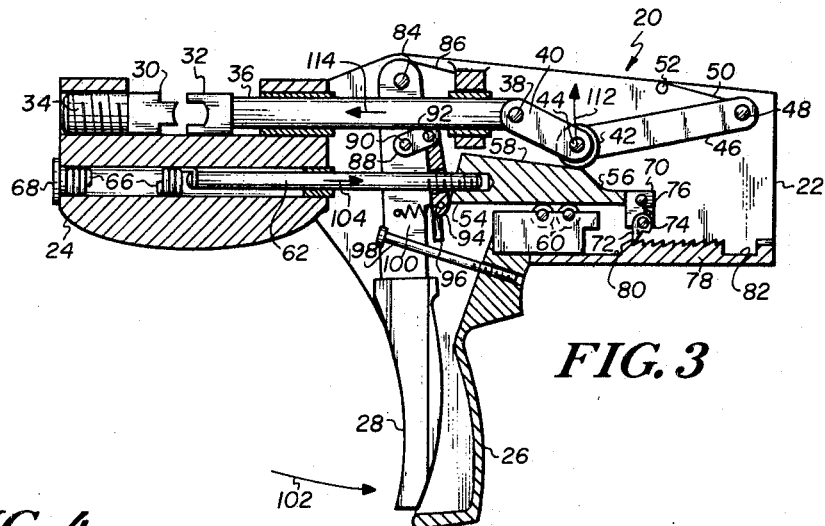
FIG. 3 is a side elevation of the tool, as shown in FIG. 2, as it appears in the operated position.

Turning now to FIG. 3, operation of the tool 20 may be better understood. As the movable handle 28 is moved in the direction of the arrow 102, (FIG. 6), link 88 coupled to the movable handle 28 by means of the pivot 90 will cause the movement of the friction drive ring 94 due to the pivot 92. As the friction drive ring 94 begins to move in the direction shown by the arrow 102, friction points 106 and 108 will engage the shaft 62 causing its movement in direction of the arrow 104. The movement of the shaft 62 in the direction of arrow 104 will cause the cam 54 to advance in the direction shown by the arrow 104 and will cause the cam follower 42 to traverse the steep rise portion 56 of the cam 54. As a result, the cam follower 42 will tend to move upwardly in the direction shown by the arrow 112. Further, the rapid rise of the cam follower 42 following the steep rise portion 56 of the cam 54 will cause the links 40 and 46 to advance the movable die 32 to a position contacting the connector placed within the die set made up of the dies 30 and 32. At this point it is no longer possible to remove the connector from the die set and successive strokes of the movable handle 28 will cause crimping action desired. As the cam 54 moves in a direction shown by the arrow 104, the block 70 will carry with it the dog 72 from the release area 80 to cause its engagement with the teeth of the rack 78. When the maximum position of the movable handle 28 has been reached by engaging a stop (not shown) in the fixed handle 26, the release of hand force on the movable handle 28 will permit the handle 28 to move in the direction shown by the arrow 110 in FIG. 7. The cam 54 will not be permitted to move in the direction shown by the arrow 114 to the engagement of the dog 72 with the teeth of the rack 78. Friction drive ring 94 will move, as shown in FIG. 7, to a position wherein further drive of the shaft 62 to the right of the figure may be accomplished. When the tab 96 arrives at the position (shown in FIG. 7) abutting the head of the screw 98 a neutral position will exist wherein no frictional drive is transmitted by the friction drive ring 94 to the shaft 62. Once the movable handle 28 has reached its maximum position, as shown in FIG. 2, under the urging of the return spring 86, a further stroke may be begun.

The successive strokes of the movable handle 28 in the direction shown by the arrow 102 will cause the advancement of the shaft 62 and thus the advancement of the cam 54 in the direction shown by the arrow 104. The cam follower 42 will move along the gentle rise portion 58 of the cam 54 and exert crimping force via the links 40 and 36 in the direction shown by the arrow 114, to the connector placed between the movable die 32 and the fixed die 30. The degree of rise of the gentle rise portion 58, its length, and the die characteristics determine the number of strokes of the movable handle 28 required to complete the crimping action. In the final stroke of the movable handle 28, the dog 72 is caused to enter the release area 82 and remove the restraining effect of the dog 72. When the movable handle 28 arrives at the position, shown in FIG. 7, causing the friction drive ring 94 to arrive at its neutral position all restraint is removed from the cam 54 and the shaft 62 is free to move under the urging of the now tensed tension spring 62 in the direction shown by the arrow 114 permitting the cam follower 42 to return to its initial position as shown in FIG. 2, thus opening the die set by moving the movable die 32 in the direction opposite to the arrow 114. With this arrangement a multi-stroke, high compression force staking tool is accomplished. With this tool the first stroke will cause the die set made up of the movable die 32 and the fixed die 30 to seize the connector and to apply some crimping force. Successive strokes of the movable handle 28 will complete the crimping action providing a good mechanical and electrical connection between the stripped portion of the electrical conductor and the connector. The number of strokes required for this action will be determined by the portions of the cam 54, the length of the cam 54, as well as the length of the rack 78. With this dog 72 and rack 78 restraining arrangement it is assured that the tool will not open its die set, made up of the movable die 32 and the fixed die 30, until a good mechanical and electrical connection is assured.

Figure 8:
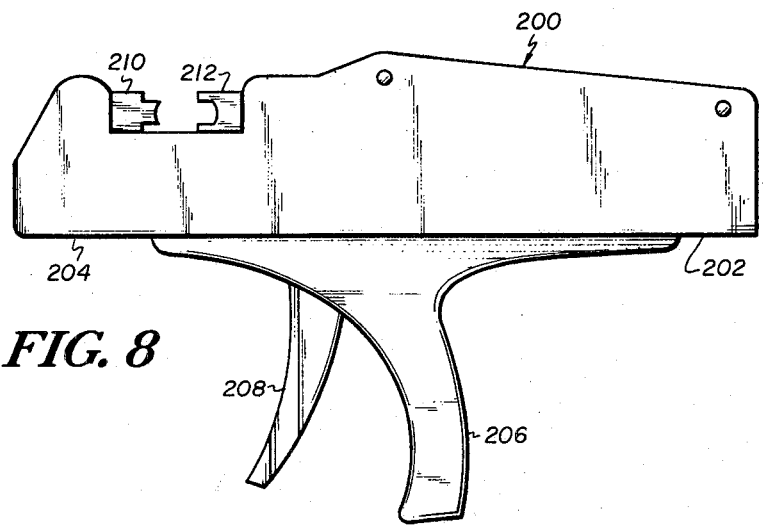
FIG. 8 is a side elevation of a second embodiment of a tool constructed in accordance with the concepts of the invention.

Turning now to FIG. 8, further embodiment of a tool constructed in accordance with the concepts of the invention is shown. Tool 200 has a body portion 202 and a die end 204. Coupled to the body 202 is a fixed handle 206, also coupled to the body 202 is a movable handle 208 arranged to move with respect to the body 202 and the fixed handle 206. Mounted at the die end 204 is a fixed, adjustable die 210 and a movable die 212.

Figure 9:
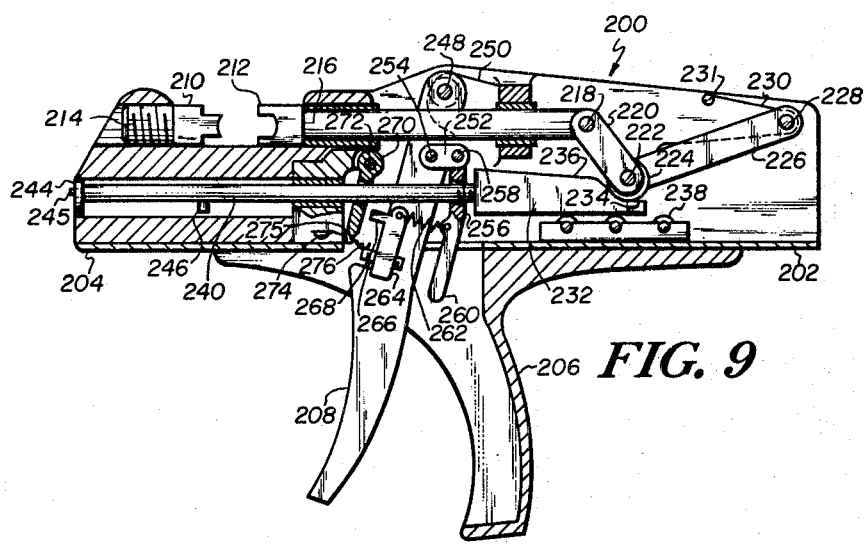
FIG. 9 is a side elevation of the tool of FIG. 8 with the housing removed and portions shown in section as it appears in the open position.

Turning now to FIG. 9, details of the tool 200, as shown in FIG. 8, are set forth. Fixed die 210 is adjusted in its position by means of a screw 214 to compensate for different sizes of connectors to be used with the tool 200 and to compensate for wear of the dies 210 and 212. Movable die 212 is positioned by means of a link 216 coupled by means of a pivot 218 to a further link 220. Link 220 is coupled by means of a pivot 222 to a cam follower 224. Also coupled to the cam follower 224 by means of the pivot 222 is a link 226 fastened to the body 202 by means of a further pivot 228. Tension spring 230 provides for the return of the link 226 to the position shown in the figure from its operated position and thus the return of the movable die 212 to its initial position as shown in the FIG. 9. Tension spring 230 fastens to the body 202 by means of a fixed stop 232. Cam follower 224 engages the cam 232 which has a steep rise portion 234 and a gentle rise portion 236. Cam 232 moves along a series of rollers 238. Rollers 238 control the position of the cam 232 and permit the easy movement of the cam 232 with respect to the body 202. The end of shaft 240 remote from the cam 232 is hollow, as shown in FIG. 13, providing the cavity 241. Further, one wall of the cavity 241 has a slot 243 in which an arm 246 is permitted to move. Arm 246 is positioned by means of a threaded shaft 245 which threadedly engages arm 246 and knurled knob 244. A compression spring 242 urges arm 246 to the right of the figure as the shaft 240 advances to the right of the figure and provides for the return of arm 246 to its initial position upon release of the shaft 240. Also coupled to the shaft 240 is an arm 246 whose function will be described below in greater detail.

Movable arm 208 is coupled by means of pivot 248 to the body 202. A return spring 250 is provided to return the movable arm 208 to the position shown, after it has been advanced toward the fixed handle 206. Further, coupled to the movable arm 208, by pivot 254, is a link 252. Link 252 is coupled to an apertured friction drive ring 256 by pivot 258. Friction drive ring 256 terminates in an apertured tab 260. Tab 260 is coupled by means of a tension spring 262, to link 264 fastened to the movable handle 208 by means of the adjustable fastener 266. Link 264 has an arm 268 which will contact the apertured friction restricting link 270. Friction restraining ring 270 is coupled to the body 202 by means of the pivot 272. Coupled to the body 202 is a flat spring 274 having a first nest 275 which will tend to urge the friction restraining ring 270 to a position engaging shaft 240. The spring 274 terminates in a retaining portion 276 into which the friction restraining ring 270 will be positioned by means of the arm 246 when it comes into contact with the friction restraining ring 270, in a manner to be described below.

Turning now to FIGS. 11 and 12, the operation of the friction drive ring 256 and the friction restraining ring 270, with respect to the shaft 240, can now be set forth. Movement of the movable handle 208, in the direction shown by the arrow 278 (FIG. 11), causes the friction drive ring 256 to generally move in the direction shown by the arrow 278. Due to the action of the spring 262, frictional engagement will be achieved between the friction drive ring 256 and the shaft 240 along the points 280 and 282. As a result, the shaft 240 will be moved in the direction shown by the arrow 284 as long as the movable handle 208 is moved in the direction shown by the arrow 278. Friction restraining ring 270, held by the nest 275 of the spring 274, will produce a low drag coupling between the friction restraining ring 270 and the shaft 240. This low drag friction will not be sufficient to impede the movement of the shaft 240 in the direction shown by the arrow 284 under the influence of friction drive ring 256. At the end of the movement of the movable handle 208 towards the fixed handle 206, a position will be reached in which the friction drive ring 256 will no longer contact the shaft 240 with sufficient friction to cause it to be driven. This position is shown in FIG. 12. The arc which link 252 traverses will tend to position tab 260 parallel with movable handle 208. In addition, screw 266 on link 264, swinging on a longer arc than link 252, will contact tab 260 and move the friction drive ring 256 to the neutral position removing frictional contact with shaft 240. The friction restraining ring 270 will be held in a slightly tilted position, as shown in FIG. 11, causing two frictional contact areas, 286 and 288, to be established to provide some restraining drag on the shaft 240. However, upon the release of the drive, by means of the friction drive ring 256, the shaft 240 will attempt to move in the direction as is shown by the arrow 290 in FIG. 12, causing friction restraining ring 70 to move in a direction generally shown by the arrow 292 and increase the gripping at the areas 286 and 288 on the shaft 240, thus preventing the shaft from being moved to the left of the figure (arrow 290 in FIG. 12). Thus the friction restraining ring 270 prevents the movement of the shaft 240.

Such action will continue for a number of strokes, that is the friction drive ring 256 will advance the shaft 240 to the right of the figure as shown by the arrow 284 in FIG. 11 during the time that the movable handle 208 is advanced in a direction shown by the arrow 278 towards the fixed handle 206. During the return strokes of the movable handle 208 under the influence of the return spring 250, friction restraining ring 270 will prevent the shaft 240 from moving to the left of the figure in the direction as shown by the arrow 290 in FIG. 12.

When the shaft 240 has advanced to the point shown in FIG. 12 wherein the arm 246 is allowed to engage the friction restraining ring 270, the friction restraining ring 270 will be forced from the nest 275 of the flat spring 274 into the remaining portion 276. The position as established by the retaining portion 276 is a neutral position wherein no friction, or very little friction, is exerted by the friction restraining ring 270 on the shaft 240. On the completion of the next stroke of the movable handle 208 the friction drive ring 256 is moved to the position as shown in FIG. 12. No restraint on the shaft 240 exists and it is now free to return to its initial position as is shown in FIG. 9 under the influence of the tension spring 230 which moves the shaft 240 via cam follower 224 and cam 232.

Turning now to the FIG. 10 there is shown the tool 200 in an operated condition whereby the manner of the operation of the tool 200 may be better understood. Once the connector to be fastened to the stripped portion of the conductor is placed between the fixed die 210 and the movable die 212 the movable handle 208 is compressed towards the fixed handle 206. This action will cause the link 252 to be rocked as the handle 208 is advanced and will cause the friction drive ring 256 to engage the shaft 240 causing it to move in the direction toward the right of the figure. The movement of shaft 240 will cause the movement of the cam 232 along the rollers 238. The cam follower 224 will be caused to rise on the steep rise portion 234 of the cam 232 causing the cam follower 224 to move in a generally upward direction. As a result the links 220 and 216 are forced to move towards the left of the figure causing the movable die 212 to close upon the connector within the die set. As a result of the movement of the shaft 240 to the right of the figure the friction restraining ring will rotate about pivot 272 restrained by the action of the flat spring 274. Friction restraining ring 270 will offer some small resistance to the movement of the shaft 240, however, it is insufficient to cause the shaft 240 to retain its position and the shaft 240 will be able to travel under the influence of the friction drive ring 256. At maximum travel of the movable handle 208, the friction drive ring 256 will take on a neutral position, as shown in FIG. 12, allowing some slight slippage of the shaft 240 under the influence of the tension spring 230. However, this slight back action of the shaft 240 in direction to the left of the figure will cause the engagement of the friction restraining ring 270 at the points 286 and 288 as shown in FIG. 11. This engagement of the friction restraining ring 270 will prevent further movement of the shaft 240 towards the left of the figure. Upon successive strokes of the movable handle 208 the shaft 240 will continue to move to the right causing the closure of the movable die 212 under the influence of the link 216. In addition, the arm 246 will be advanced by the movement of the shaft 240 to the right to a position adjacent the friction restraining ring 270. The last stroke of operation as determined by the die, the desired compression force, and established by the shape of the cam, position of arm 246 will advance arm 246 to engage with the friction restraining ring 270 and will force the friction restraining ring 270 from its position in nest 275 of the flat ring spring 274 to the restraining portion 276, to lock the friction restraining ring 270 in a position whereby no friction, or very little friction, will be exerted upon the shaft 240. As the movbale handle 208 completes its operation and moves the friction drive ring 256 to the position as shown in FIG. 12 no restraint will be applied to the shaft 240 and it will be free to move to the left under the influence of the tension spring 230. When the movable handle 208 is moved from its closed position to its fully opened position, the arm 268 will engage the friction restraining ring 270 and remove it from the retaining portion 276 and return it to the nest 275 of the flat spring 274 thus freeing the device for a further cycle of operation.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. In a tool having a housing, a first handle grip fixedly connected to said housing and a second handle grip mounted on said housing and movable with respect to said housing and said first handle grip, a high force producing device comprising: push rod means; drive means coupled to said second handle grip and to said push rod means to move said push rod means in a first direction when said second handle grip is operated towards said first handle grip; said drive means moving with respect to said push rod means when said second handle grip is operated away from said first handle grip; and selectively operable restraining means coupled to said push rod means and operable to restrain said push rod means from moving in a second direction opposite said first direction when said second handle grip is operated away from said first handle grip; said restraining means being inoperative to restrain said push rod means from moving in said first direction when said second handle grip is operated towards said first grip.

2. A tool as defined in claim 1, wherein said drive means is a first friction ring and said high force producing device further comprises: first biasing means coupled between said first friction ring and said second handle grip to provide a frictional coupling between said first friction ring and said push rod means.

3. A tool as defined in claim 2, further comprising: first release means coupled to said push rod means to release said restraining means when said push rod means reaches a predetermined position and permit said push rod means to be moved in said second direction to its initial position.

4. A tool as defined in claim 3, further comprising: second release means coupled to said second handle grip and engageable with said first friction ring after said first release means has been operated to remove said frictional coupling between said first friction ring and said push rod means.

5. A tool as defined in claim 4, wherein said first and second release means are adjustable and said first release means further comprises second biasing means coupled to said push rod means to return said push rod means to its initial position upon the operation of said first and second release means.

6. A tool as defined in claim 2, wherein said selectively operable restraining means is a second friction ring and said high force producing device further comprises: second biasing means coupled between said housing and said second frictional ring; said second biasing means providing a frictional coupling between said second friction ring and said push rod means.

7. A tool as defined in claim 2, wherein said selectively operable restraining means comprises: rack means connected to said housing and dog means coupled to said push rod means and carried thereby adjacent said rack; second biasing means coupled between said housing and said dog means urging contact therebetween.

8. A tool as defined in claim 7, further comprising: first release means adjacent said rack means and engageable by said dog means to release said dog means from said rack when said push rod means reaches a predetermined position and permit said push rod means to be moved in said second direction to its initial position.

9. A tool as defined in claim 8, further comprising: second release means coupled to said first handle grip and engageable by said second handle grip when said second handle grip has completed its movement towards said first handle grip; said second release means operating upon said first friction ring after said first release means has been operated to remove said frictional coupling between said first friction ring and said push rod means.

10. A tool as defined in claim 9, wherein said second release means is adjustable and further comprising: third biasing means coupled to said push rod means to return said push rod means to its initial position upon the operation of said first and second release means.

11. A tool for crimping connectors to electrical conductors comprising: a housing; a first handle grip fixedly connected to said housing; a second handle grip mounted on said housing and movable with respect to said housing and said first handle grip; a fixed die coupled to said housing; a movable die coupled to said housing adjacent said fixed die; said fixed and movable dies being spaced apart at an initial position to receive a connector therebetween; said movable die capable of being moved from said initial position to a closed position with said fixed die to crimp said connector to an electrical conductor inserted therein; push rod means mounted in said housing; drive means coupled to said second handle grip and to said push rod means to move said push rod means in a first direction when said second handle grip is operated towards said first handle grip; said drive means moving with respect to said push rod means when said second handle grip is operated away from said first handle grip; selectively operable restraining means coupled to said push rod means and operable to restrain said push rod means from moving in a second direction opposite said first direction when said second handle grip is operated away from said first handle grip; said restraining means being inoperative to restrain said push rod means from moving in said first direction when said second handle grip is operated towards said first handle grip; cam means coupled to said push rod means and positionable thereby; linkage means coupled to said movable die for moving it with respect to said fixed die; and cam follower means coupled to said linkage means and engageable with said cam means whereby said movable die is caused to close upon a connector placed between said movable and fixed dies in accordance with the surface of said cam means.

12. A tool as defined in claim 11, further comprising adjusting means coupled to said fixed die whereby the initial position of said fixed die can be selectively set.

13. A tool as defined in claim 11, wherein said drive means is a first friction ring, said tool further comprising: first biasing means coupled between said first friction ring and said second handle grip to provide a frictional coupling between said first friction ring and said push rod means.

14. A tool as defined in claim 13, further comprising: first release means coupled to said push rod means to release said restraining means when said push rod means reaches a predetermined position and permit said push rod means to be moved in said second direction to its initial position.

15. A tool as defined in claim 14 further comprising: second release means coupled to said second handle grip and engageable with said first friction ring after said first release means has been operated to remove said frictional coupling between said first friction ring and said push rod means.

16. A tool as defined in claim 15, wherein said first and second release means are adjustable and said first release means further comprises second biasing means coupled to said push rod means to return said push rod means to its initial position upon the operation of said first and second release means.

17. A tool as defined in claim 13, wherein said selectively operable restraining means is a second friction ring; the tool further comprising; second biasing means coupled between said housing and said second frictional ring; said second biasing means providing a frictional coupling between said second friction ring and said push rod means.

18. A tool, as defined in claim 13, wherein said selectively operable restraining means comprises: rack means connected to said housing and dog means coupled to said push rod means and carried thereby adjacent said rack means; second biasing means coupled between said push rod means and said dog means urging contact between said dog means and said rack means.

19. A tool as defined in claim 18, further comprising: first release means adjacent said rack means and engageable by said dog means to release said dog means from said rack means when said push rod means reaches a predetermined position and permit said push rod means to be moved in said second direction to its initial position.

20. A tool as defined in claim 19, further comprising: second release means coupled to said first handle grip and engageable by said second handle grip when said second handle grip has completed its movement towards said first handle grip; said second release means operating upon said first friction ring after said first release means has been operated to remove said frictional coupling between said first friction ring and said push rod means.

21. A tool as defined in claim 20, wherein said second release means is adjustable and further comprising: third biasing means coupled to said push rod means to return said push rod means to its initial position upon the operation of said first and second release means.

References Cited

UNITED STATES PATENTS

| | | | |
|---|---|---|---|
| 2,351,049 | 6/1944 | Kaman | 72—453 |
| 2,568,054 | 9/1951 | Clapp | 72—416 |
| 2,687,149 | 8/1954 | Badeau | 140—113 |
| 2,838,970 | 6/1958 | Motches | 72—410 |
| 2,897,703 | 8/1959 | Fischer | 72—453 |
| 2,962,074 | 11/1960 | Dupre | 72—453 |
| 3,066,717 | 12/1962 | Lynch | 72—412 |
| 3,091,432 | 5/1963 | Chartier | 254—106 |
| 3,174,323 | 3/1965 | Over | 72—412 |
| 3,190,104 | 6/1965 | Anthony | 72—391 |
| 3,359,779 | 12/1967 | Filia | 72—412 |

FOREIGN PATENTS 787,304    7/1935    France.

CHARLES W. LANHAM, Primary Examiner

G. P. CROSBY, Assistant Examiner

U.S. Cl. X.R.

72—451, 452; 140—113; 254—106; 81—9.1, 363